US012794006B2

(12) United States Patent
Yan et al.

(10) Patent No.: US 12,794,006 B2
(45) Date of Patent: Nov. 10, 2026

(54) BATTERY MODULE FRAMING ASSEMBLY

(71) Applicant: GM Global Technology Operations LLC, Detroit, MI (US)

(72) Inventors: Xianfeng Yan, Clawson, MI (US); Matthew Simonin, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 525 days.

(21) Appl. No.: 18/491,275

(22) Filed: Oct. 20, 2023

(65) Prior Publication Data

US 2025/0132373 A1 Apr. 24, 2025

(51) Int. Cl.

*H01M 10/04* (2006.01)
*H01M 50/209* (2021.01)
*H01M 50/249* (2021.01)
*H01M 50/264* (2021.01)

(52) U.S. Cl.

CPC ..... *H01M 10/0481* (2013.01); *H01M 50/209* (2021.01); *H01M 50/249* (2021.01); *H01M 50/264* (2021.01); *H01M 2220/20* (2013.01)

(58) Field of Classification Search

CPC ........... H01M 10/0481; H01M 50/249; H01M 50/209; H01M 50/264; H01M 50/262; H01M 50/269
USPC .......................................................... 429/157
See application file for complete search history.

(56) References Cited

U.S. PATENT DOCUMENTS

2011/0104548 A1 5/2011 Saito et al.
2013/0183571 A1 7/2013 Miyazaki et al.
2014/0127553 A1* 5/2014 Ishibashi .................. H01G 2/04 429/157
2014/0220391 A1* 8/2014 Fujii .................. H01M 50/264 429/7
2018/0026243 A1* 1/2018 Stojanovic .............. B60L 58/21 429/99
2018/0151859 A1* 5/2018 Aizawa ............... H01M 50/505
2022/0059897 A1* 2/2022 Huang ................ H01M 50/103
2025/0149713 A1* 5/2025 Yoon ................... H01M 10/613

FOREIGN PATENT DOCUMENTS

RU 2256052 C2 * 7/2005 ............. E05B 91/00

OTHER PUBLICATIONS

RU 2256052 MT (Year: 2005).*

* cited by examiner

*Primary Examiner* — Jonathan G Leong
*Assistant Examiner* — John S Medley
(74) *Attorney, Agent, or Firm* — Vivacqua Crane, PLLC

(57) ABSTRACT

A framing assembly for a battery module having at least one battery cell stack. The framing assembly includes end plates for forming ends to the battery cell stack, side plates for forming sides to the battery cell stack, and locking plates for securing each end of the side plates to an end plate. The end plates have studs that project from the end plates, the side plates have open-ended slots to receive the studs and pins near the open-ended slots that project from the side plate. The locking plates have stud openings and pin openings that contain the studs and pins when securing the side plates to end plates. Fasteners engage with the studs to retain the locking plates on the studs and pins. Framing assembly maintains compression of the battery cell stacks.

5 Claims, 7 Drawing Sheets

BATTERY MODULE FRAMING ASSEMBLY

INTRODUCTION

The present disclosure relates to a battery module framing assembly having battery cell stacks. More particularly, the present disclosure relates to the connection of side plates to end plates to form a compression frame on a battery cell stack.

Electric vehicles and hybrid vehicles employ a high voltage electric battery system that includes a number of battery cells. These electric and hybrid vehicles typically require several battery cells to provide enough power to meet vehicle power and energy requirements. The battery cells are often located under the vehicle body midway between the front and rear wheels.

To achieve the needed power, several battery cells are arranged in a stack and compressed together. Multiple battery cell stacks may be included in a battery module. In a battery module assembly, the connection between the end plate and side plate is a very critical joint that needs to be designed for ease of assembly, to maintain the cell compression over the life cycle, and to meet stringent load cases. Typically, adhesives and welding are used to connect end plates and side plates. While effective, there is a need in the art for improved assembly techniques that are easier to assembly, and that may be easily non-destructively disassembled to allow for module level serviceability and easy recycling.

SUMMARY

A framing assembly for a battery module having at least one battery cell stack is provided. The framing assembly includes end plates for forming ends to the battery cell stack, each end plate having a battery side to face the battery cell stack and an exterior side opposite the battery side, the exterior side having studs extending away from the exterior side, side plates for forming sides to the battery cell stack, the side plates having opposite ends and a sidewall section that extends between the ends, the sidewall section having a battery side to face the battery cell stack and an exterior side opposite the battery side, each side plate end having a locking section that extends away from the sidewall section in a direction that the sidewall battery side faces, the locking section having an open ended slot and a pin that extends away from the locking section, locking plates for securing the side plates to the end plates, the locking plates having a stud opening and a pin opening and fasteners that engage with the studs. One of the end plates is positioned on each end of the battery cell stack, the side plates are positioned along opposite sides of the battery cell stack with each locking section disposed over the exterior side of an end plate and the stud disposed within the slot, the locking plates disposed on the locking sections with the stud in the stud opening and the pin in the pin opening, and wherein the fasteners are attached to the studs and secure the locking plates on the stud and pin, and the framing assembly maintains compression of the battery cell stack.

In one aspect, the end plates have side edges and a stud is adjacent to each side edge.

In another aspect, the end plate has studs adjacent each side edge, the side plate locking sections have pins and have an open ended slot for each stud adjacent the end plate side edge.

In another aspect, the locking plate has opposite end locking sections and an intermediate section that extends between the end locking sections, each locking plate end section having a stud opening and a pin opening, and the locking plate secures the side plate on each side of the battery cell stack to the end plate with each locking plate end section disposed on the side plate locking section with the stud in the stud opening and the pin in the pin opening.

In another aspect, the locking plate intermediate section has a rib portion that extends between the end locking sections.

In another aspect, a mid-beam for forming sides to adjacent battery cell stacks is included, the mid-beam having opposite ends and a mid-beam section that extends between the ends, the mid-beam section having opposite first and second sides to face the adjacent battery cell stacks, each mid-beam end having a dual locking section, the dual locking section having a first locking portion that extends away from the first mid-beam side and a second locking portion that extends away from the second mid-beam side, the first and second locking portions each having an open ended slot and a pin that extends away from the locking portion. One of the end plates is positioned on each end of adjacent battery cell stacks, the mid-beam is positioned between facing sides of adjacent battery cell stacks with each locking portion disposed over the exterior side of an end plate and the stud disposed within the slot, the side plates are positioned along non-facing sides of the adjacent battery cell stacks with each locking section disposed over the exterior side of an end plate and the stud disposed within the slot, the locking plates disposed on the locking portions with the stud in the stud opening and the pin in the pin opening and disposed on the locking sections with the stud in the stud opening and the pin in the pin opening, and wherein the fasteners are attached to the studs and secure the locking plates on the stud and pin, and the framing assembly maintains compression of the battery cell stacks.

In another aspect, a mid-beam locking plate is included having a first section with a stud opening and a pin opening and a second section with a stud opening and a pin opening, wherein the mid-beam locking plate is disposed on the first and second mid-beam locking portions with the studs in the stud openings and the pins in the pin openings, and the mid-beam locking plate secures the mid-beam to two end plates.

In another aspect, side beams are included having opposite ends, a rectangular cross section, and a sidewall surface, wherein each side plate has a side beam attached to the sidewall exterior side.

In another embodiment, a battery module is provided. The battery module includes a plurality of battery cells positioned in a battery cell stack, the battery cell stack having opposite ends and opposite sides that extend between the ends, end plates each having a battery side to face battery cells and an exterior side opposite the battery side, the exterior side having studs extending away from the exterior side, side plates each having opposite ends and a sidewall section that extends between the ends, the sidewall section having a battery side to face battery cells and an exterior side opposite the battery side, each side plate end having a locking section that extends away from the sidewall section in a direction that the sidewall battery side faces, the locking section having an open ended slot and a pin that extends away from the locking section, locking plates for securing the side plates to the end plates, the locking plates each having a stud opening and a pin opening, and fasteners that engage with the studs. One end plate is positioned on each end of the battery cell stack, one side plate is positioned along each side of the battery cell stack with each locking section being over the exterior side of one of the end plates and the stud disposed in the slot, the locking plates are disposed on the locking sections with the stud in the stud opening and the pin in the pin opening, the fasteners are attached to the studs and secure the locking plates on the stud and pin, and the side plates are secured to the end plates and maintain compression of the of battery cell stack.

In one aspect, the end plates have side edges and a stud is adjacent to each side edge.

In another aspect, the end plates have studs adjacent each side edge, the side plate locking sections have pins and have an open ended slot for each stud adjacent the end plate side edge.

In another aspect, the locking plate has opposite end locking sections and an intermediate section that extends between the end sections, each locking plate end locking section having a stud opening and a pin opening, and the locking plate secures the side plate on each side of the battery cell stack to the end plate with each locking plate end locking section disposed on the side plate locking section with the stud in the stud opening and the pin in the pin opening.

In another aspect, the locking plate intermediate section has a rib portion that extends between the end sections.

In another aspect, side beams are included having opposite ends, a rectangular cross section, and a sidewall surface, wherein each side plate has a side beam attached to the sidewall exterior side.

In yet another embodiment, a battery module is provided. The battery module includes a plurality of battery cells positioned in two battery cell stacks, each of the battery cell stacks having opposite ends and opposite sides that extend between the ends, the battery cell stacks are positioned adjacent with each battery cell stack having a facing side that faces the other battery cell stack and a non-facing side that faces opposite the facing side, end plates each having a battery side to face battery cells and an exterior side opposite the battery side, the exterior side having studs extending away from the exterior side, side plates each having opposite ends and a sidewall section that extends between the ends, the sidewall section having a battery side to face battery cells and an exterior side opposite the battery side, each side plate end having a locking section that extends away from the sidewall section in a direction that the sidewall battery side faces, the locking section having an open ended slot and a pin that extends away from the locking section, a mid-beam having opposite ends and a mid-beam section that extends between the ends, the mid-beam section having opposite first and second sides to face the adjacent battery cell stacks, each mid-beam end having a dual locking section, the dual locking section having a first locking portion that extends away from the first mid-beam side and a second locking portion that extends away from the second mid-beam side, the first and second locking portions each having an open ended slot and a pin that extends away from the locking portion, locking plates for securing the side plates and the mid-beam to the end plates, each of the locking plates having a stud opening and a pin opening, and fasteners that engage with the studs. One of the end plates is positioned on each end of the adjacent battery cell stacks, the mid-beam is positioned between the facing sides of the adjacent battery cell stacks with each locking portion disposed over the exterior side of an end plate and the stud disposed within the slot, the side plates are positioned along the non-facing sides of the adjacent battery cell stacks with each locking section disposed over the exterior side of an end plate and the stud disposed within the slot, the locking plates disposed on the locking portions with the stud in the stud opening and the pin in the pin opening and disposed on the locking sections with the stud in the stud opening and the pin in the pin opening, and wherein the fasteners are attached to the studs and secure the locking plates on the stud and pin, and the mid-beam and side plates are secured to the end plates and maintain compression of the battery cell stacks.

In one aspect, the end plates have side edges and a stud is adjacent to each side edge.

In another aspect, the end plates have studs adjacent each side edge, the side plate locking sections have pins and have an open ended slot for each stud adjacent the end plate side edge, and the mid-beam first and second locking portions each have pins and have an open ended slot for each stud adjacent the end plate side edge.

In another aspect, the locking plates have opposite end locking sections and a middle locking section between the end locking sections, each end locking section having a stud opening and a pin opening, the middle locking section having spaced apart stud openings and spaced apart pin openings, the locking plate secures the side plate on each side of the battery cell stacks to an end plate with each end locking section disposed on the side plate locking section with the stud in the stud opening and the pin in the pin opening, and the locking plate secures the mid-beam to end plates of both battery cell stacks with the middle locking section disposed on the locking portions of the dual locking section with the studs in the stud openings and the pins in the pin openings.

In another aspect, the locking plates include side locking plates that secure the side plates to the end plates and mid-beam locking plates that secure the mid-beam to two end plates, each side locking plate having a stud opening and a pin opening, each mid-beam locking plate having spaced apart stud openings and spaced apart pin openings, the side locking plates secure the locking section of a side plate on a side of the battery cell stacks to an end plate with the side locking plate disposed on the side plate locking section with the stud in the stud opening and the pin in the pin opening, and the mid-beam locking plate secures the mid-beam to end plates of both battery cell stacks with the mid-beam locking plate disposed on the locking portions of the dual locking section with the studs in the stud openings and the pins in the pin openings.

In another aspect, side beams are included having opposite ends, a rectangular cross section, and a sidewall surface, wherein each side plate has a side beam attached to the sidewall exterior side.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
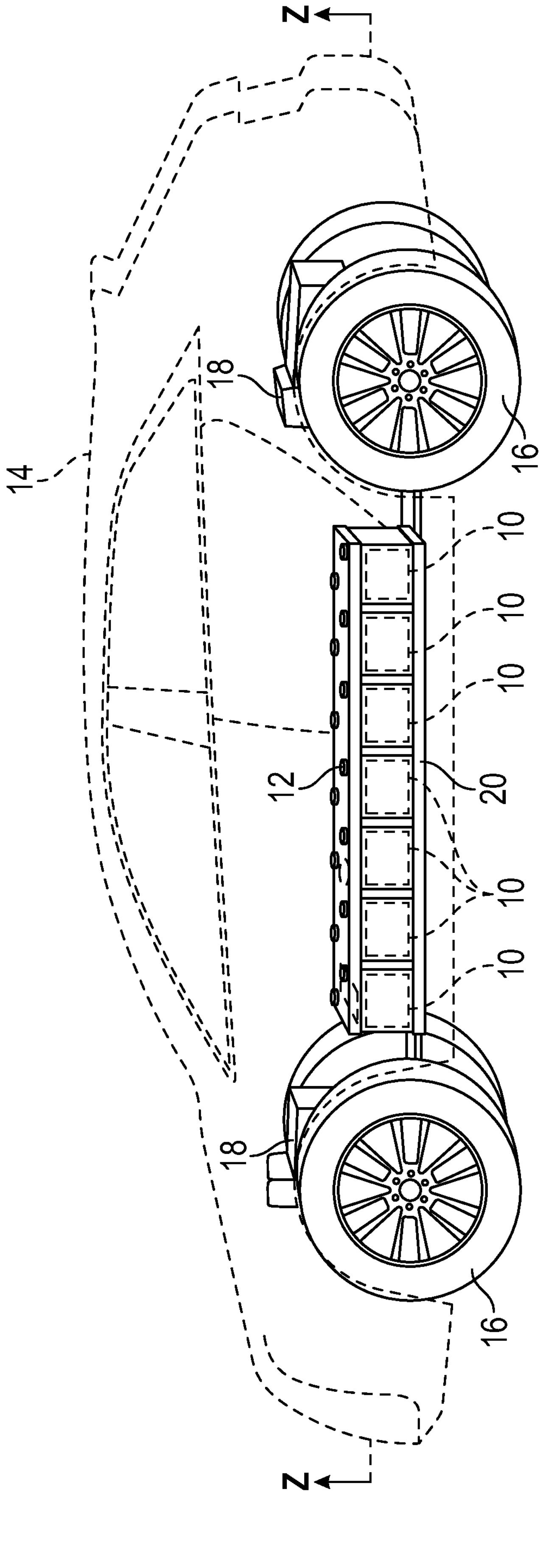
FIG. 1 is a schematic view of an exemplary motor vehicle having a battery pack with battery modules according to the principles of the present disclosure.

Referring to FIG. 1, a battery module 10 for a battery pack 12 according to the principles of the present disclosure is shown. The battery module 10 is configured to be used with battery cell stacks, as will be described in greater detail below. The battery pack 12 is illustrated with an exemplary vehicle 14. The vehicle 14 is preferably an electric vehicle or hybrid vehicle having wheels 16 driven by electric motors/inverters 18. The electric motors/inverters 18 receive motive power from the battery pack 12. While the vehicle 14 is illustrated as a passenger road vehicle, it should be appreciated that the battery module 10 and the battery pack 12 may be used with various other types of vehicles. For example, the battery module 10 and the battery pack 12 may be used in nautical vehicles, such as boats, or aeronautical vehicles, such as drones or passenger airplanes. Moreover, the battery module 10 and the battery pack 12 may be used as a stationary power source separate and independent from a vehicle.

The battery pack 12 generally includes a battery tray 20 connected to the vehicle 14. The battery tray 20 provides structural support to one or a plurality of battery modules 10 disposed within the battery pack 12. The battery modules 10 are preferably lithium-ion battery cells. However, it should be appreciated that any type of battery cell may be employed.

Figure 2:
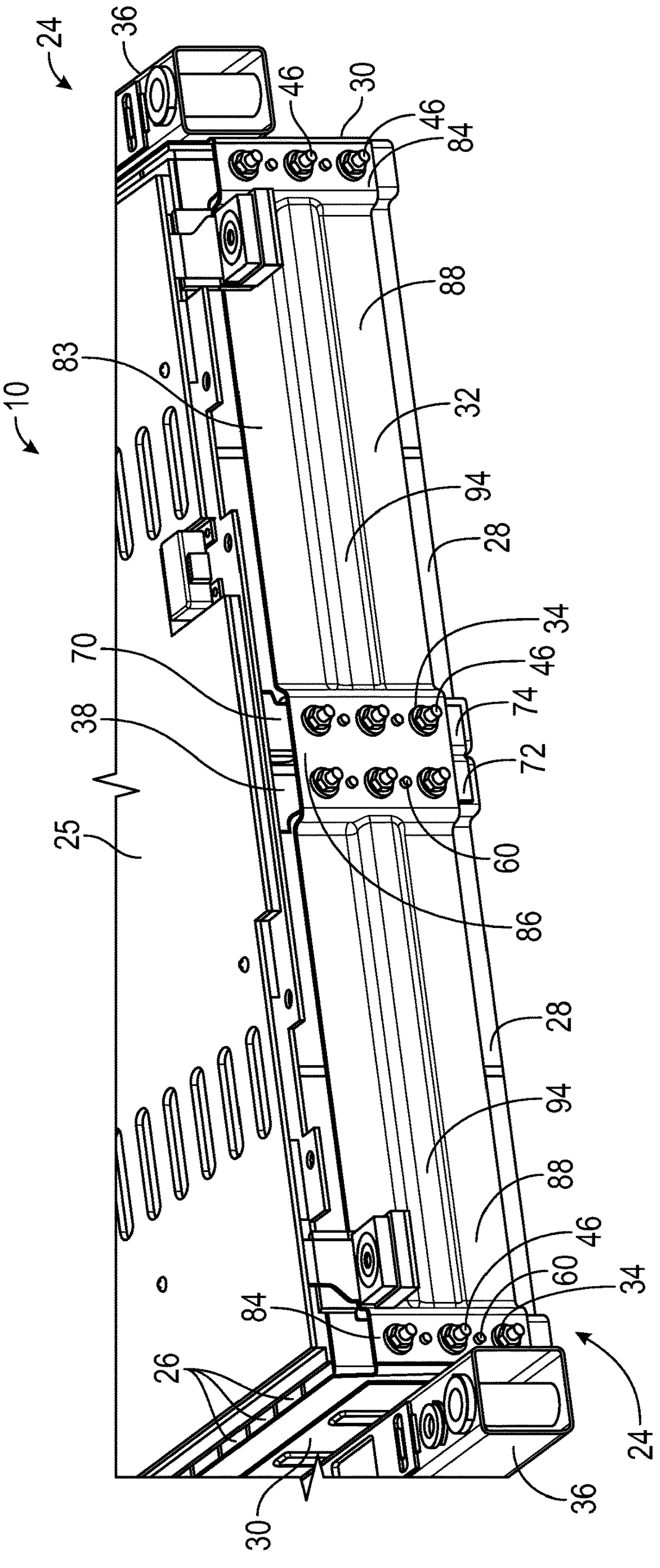
FIG. 2 is a fragmented isometric view of a dual battery cell stack battery module with a single piece locking plate according to an exemplary embodiment.
Figure 3:
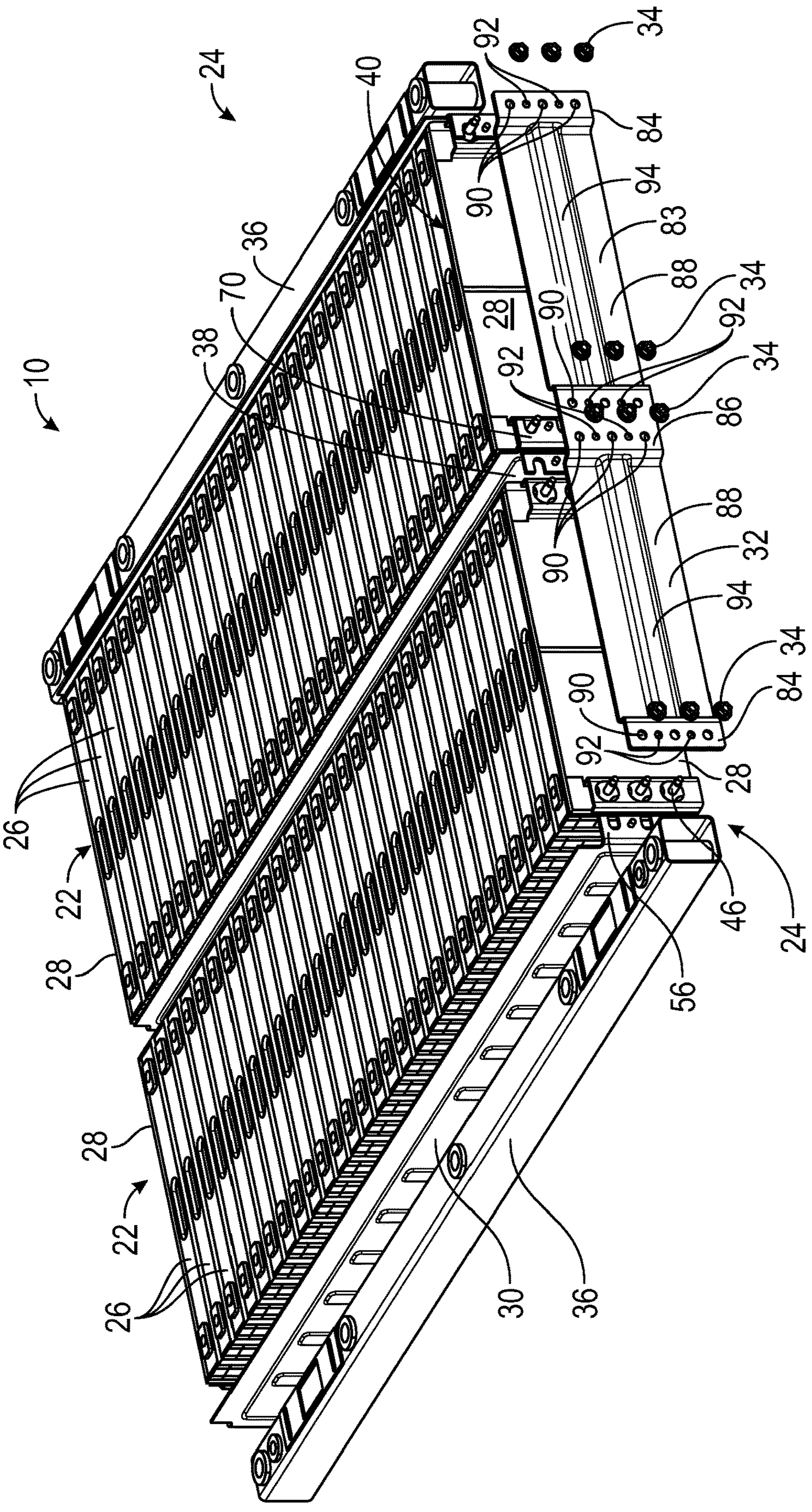
FIG. 3 is an isometric exploded view of a dual battery cell stack battery module with a single piece locking plate according to an exemplary embodiment.

Referring now to FIGS. 2 and 3, the battery module 10 is illustrated with two battery cell stacks 22, the components of a framing assembly 24, and a cover 25. Each battery cell stack 22 includes battery cells 26 that are positioned adjacent one another and compressed together. Battery cells 26 are preferably rectangular plate shaped lithium-ion battery cells. However, it should be appreciated that any type of battery cell 26 may be employed so long as the battery cell 26 is compatible with the framing assembly 24.

Framing assembly 24 is used to assemble the battery module 10 and secure and maintain compression of the battery cells 26 in the battery cell stacks 22 over the life cycle of the battery cells 26 as well as to meet stringent load cases. Framing assembly 24 provides a relatively easy assembly of the battery module 10 and enables the battery module 10 to be easily non-destructively disassembled to allow for battery module 10 level serviceability and easy recycling. The framing assembly 24 includes end plates 28 that form ends to the battery cell stack 22, side plates 30 that form sides to the battery cell stack 22, locking plates 32 that secure the side plates 30 to the end plates 28, and fasteners 34 that secure the locking plates 32 to the end plates 28. The locking plates 32, as described below with reference to FIGS. 8 and 9, can be in different configurations. Framing assembly 24 may also include side beams 36 that are attached to side plates 30. When there are adjacent battery cell stacks 22, the framing assembly 24 may also include a mid-beam 38 to be positioned between the adjacent battery cell stacks 22. The mid-beam 38 forms sides to both of the adjacent battery cell stacks 22. The locking plates 32 secures the mid-beam 38 to the end plates 28.

Figure 6:
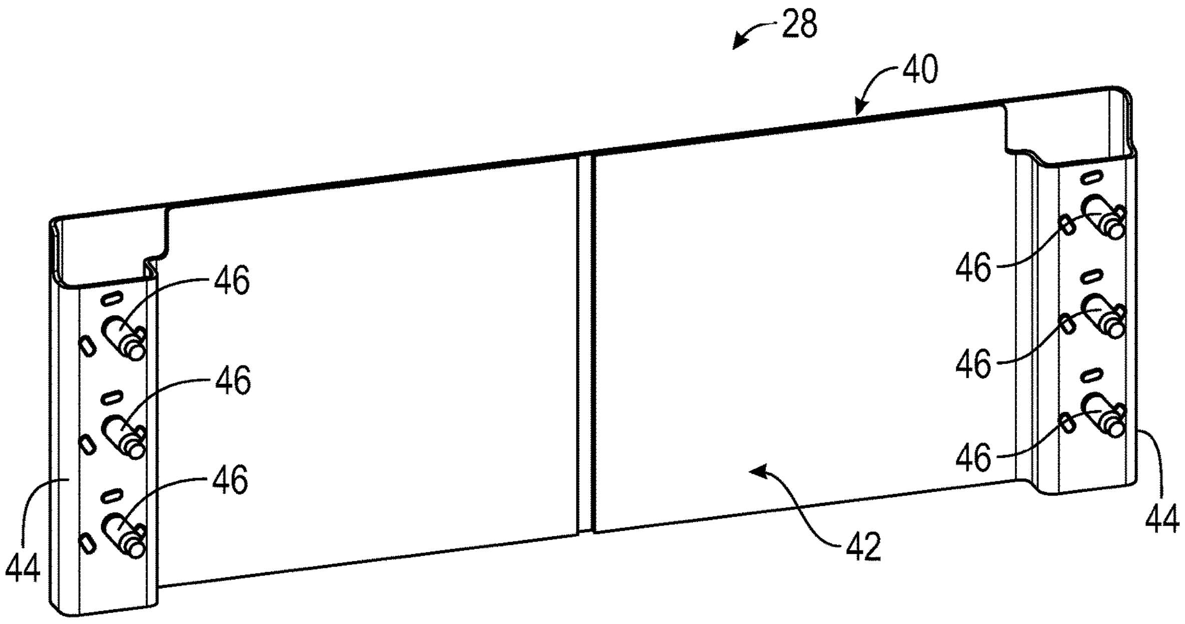
FIG. 6 is an isometric view of an end plate according to an exemplary embodiment.

With reference to FIG. 6, the end plates 28 have a battery side 40 to face the battery cells 26 and an exterior side 42 opposite the battery side 40. The end plates 28 have side edges 44. The end plates 28 have multiple studs 46 that extend away from the exterior side 42. The studs 46 may be positioned adjacent each side edge 44. The fasteners 34 are attachable to the studs 46. The studs 46 may be threaded to attach to the fasteners 34.

Figure 4:
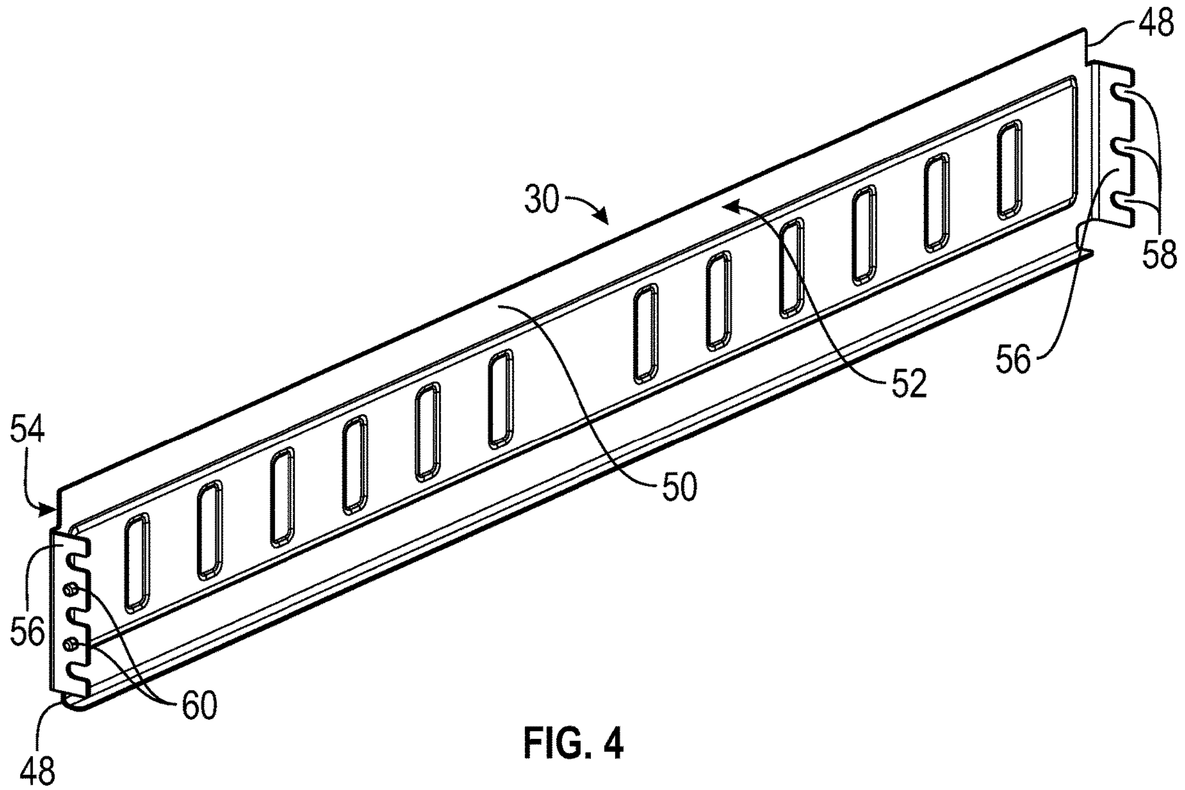
FIG. 4 is an isometric view of a side plate according to an exemplary embodiment.

With reference to FIG. 4, the side plates 30 have opposite ends 48 and a sidewall section 50 that extends between the ends 48. The sidewall section 50 has a battery side 52 to face the battery cells 26 and an exterior side 54 opposite the battery side 52. The side plates 30 have locking sections 56 on the ends 48 and the locking sections 56 extend away from the sidewall section 50 in a direction that the battery side 52 faces. The locking section 56 may be perpendicular to the sidewall section 50 or at a different angle. The locking sections 56 each have open-ended slots 58 and pins 60 that extend away from the locking sections 56. The slots 58 are configured to receive the studs 46. The pins 60 extend parallel to the sidewall section 50. The pins 60 engage with the locking plates 32, as described below.

Figure 5:
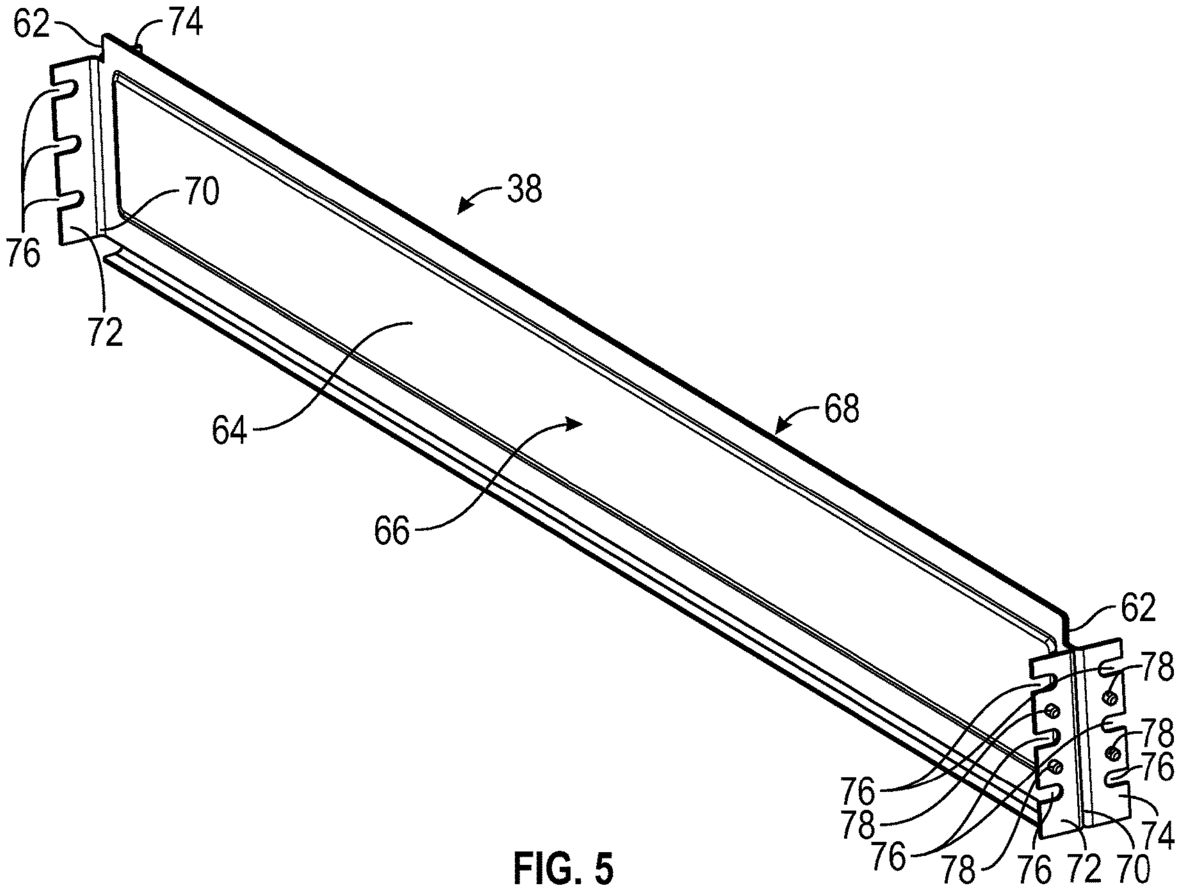
FIG. 5 an isometric view of a mid-beam according to an exemplary embodiment.

With reference to FIG. 5, the mid-beam 38 has opposite ends 62 and a mid-beam section 64 that extends between the ends 62. The mid-beam section 64 has a first side 66 and a second side 68 opposite the first side 66. The mid-beam 38 is positioned between adjacent battery cell stacks 22 and the mid-beam first side 66 faces a first one of the adjacent battery cell stacks 22 and the mid-beam second side 68 faces a second one of the adjacent battery cell stacks 22. The mid-beam ends 62 each have a dual locking section 70. The dual locking section 70 has a first locking portion 72 that extends away from the mid-beam section 64 in a direction that the first side 66 faces and a second locking portion 74 that extends away from the mid-beam section 64 in a direction that the second side 68 faces. The first and second mid-beam locking portions 72, 74 are perpendicular to the mid-beam section 64 or can be at a different angle. Both locking portions 72, 74 have open-ended slots 76 and pins 78 that extend away from the locking portions 72, 74. The slots 76 are configured to receive the studs 46. The pins 78 may extend parallel to the mid-beam section 64. The pins 78 engage with the locking plates 32, as described below.

Figure 7:
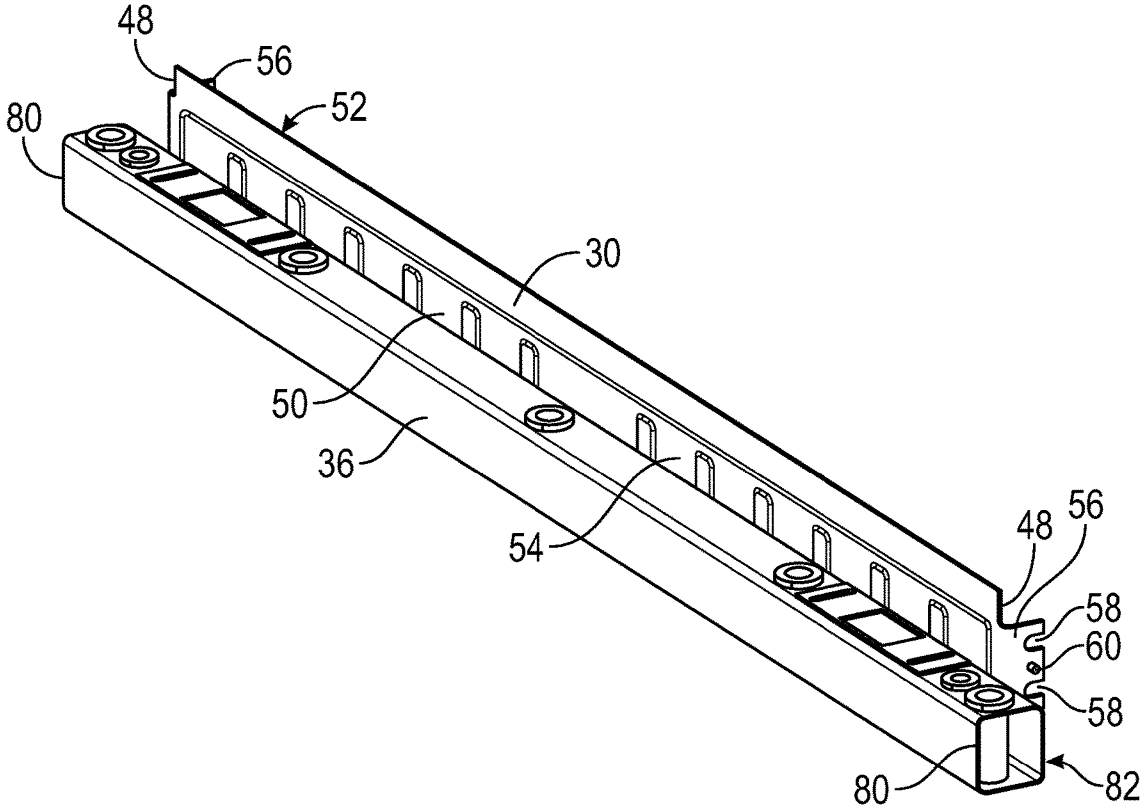
FIG. 7 is an isometric view of a side plate with an attached side beam according to an exemplary embodiment.

With reference to FIG. 7, the side beams 36 have opposite ends 80 and a sidewall surface 82. The side beams 36 have a rectangular cross section or may have another shape. The side beams 36 are attached to the exterior side 54 of the sidewall section 50 of the side plates 30 with the sidewall surface 82 facing the sidewall section 50. The side beams 36 may be welded to the side plates 30 or attached with other techniques. The side beams 36 may be sized so that the ends 80 of the side beams 36 extend beyond the ends 48 of the side plates 30. The side beams 36 provide structural support to the side plates 30 and may facilitate moving of the side plates 30 relative to the battery cell stacks 22 to engage the locking sections 56 with the end plates 28.

Referring to FIGS. 2 and 3, the locking plates 32 can be configured as complete locking plates 83 to enable a single locking plate 32 to be used on each end of the battery module 10 having two adjacent battery cell stacks 22. The complete locking plates 83 secure the side plates 30 and mid-beam 38 to the end plates 28 on the two adjacent battery cell stacks 22 with one complete locking plate 83 for each end of the battery module 10. The complete locking plate 83 has opposite end locking sections 84 and a middle locking section 86 positioned between the end locking sections 84. The complete locking plate 83 has intermediate sections 88 between the middle locking section 86 and each end locking section 84. The end locking sections 84 each have stud openings 90 and pin openings 92 to allow insertion of the studs 46 on the end plate 28 and the pins 60 on the side plate 30. The middle locking section 86 has two sets of spaced apart stud openings 90 and pin openings 92 to allow insertion of the studs 46 on two end plates 28 and the pins 78 on the mid-beam 38. The intermediate sections 88 extend along the exterior sides 42 of the end plates 28. The intermediate sections 88 can have a rib portion 94 that extends between the end locking section 84 and the middle locking section 86. The rib portions 94 can increase the stability and rigidity of the complete locking plate 83.

Figure 8:
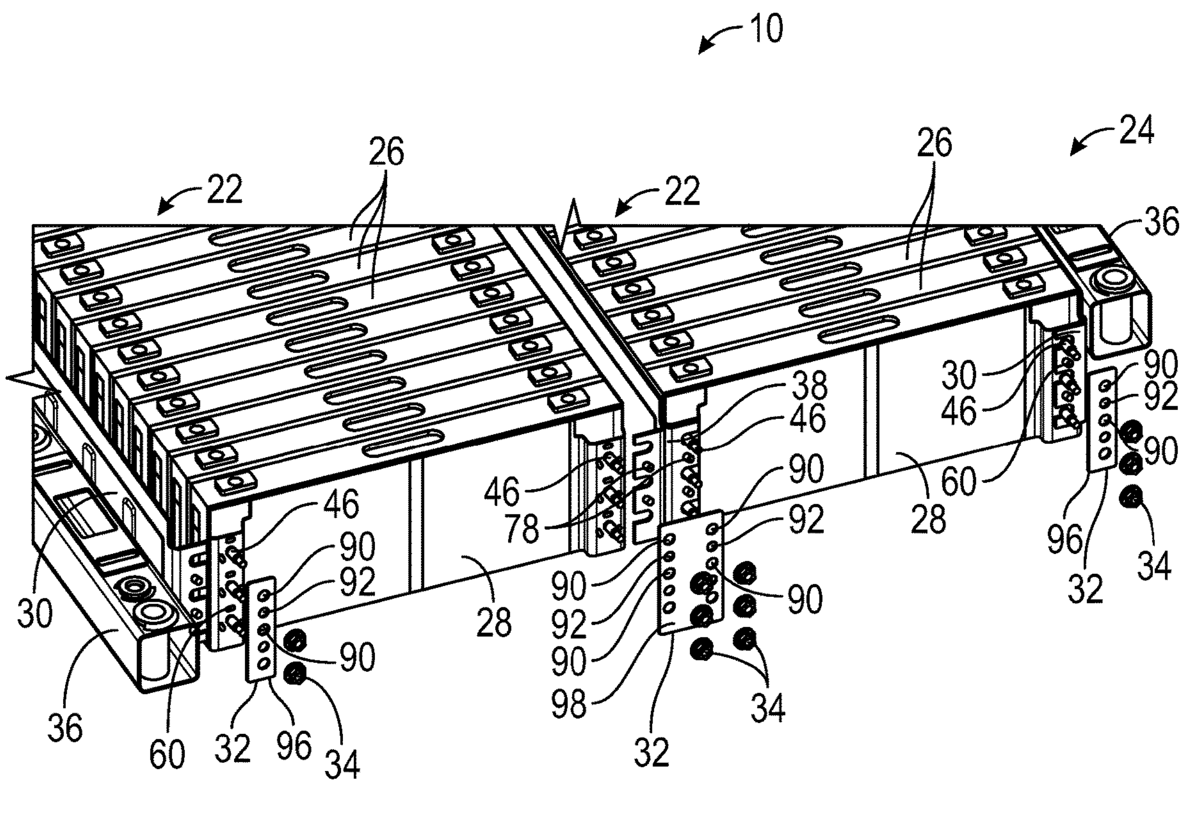
FIG. 8 is a fragmented isometric exploded view of a dual battery cell stack battery module with multiple locking plates according to an exemplary embodiment.

Referring to FIG. 8, the locking plates 32 can be configured to enable multiple locking plates 32 to be used on each end of the battery module 10 having two adjacent battery cell stacks 22. The locking plates 32 secure the side plates 30 and mid-beam 38 to the end plates 28 on the two adjacent battery cell stacks 22 with multiple locking plates 32 for each end of the battery module 10. The locking plates 32 can include a side locking plate 96 to secure a side plate 30 to an end plate 28 and a mid-beam locking plate 98 to secure the mid-beam 38 to two end plates 28. The side locking plate 98 has stud openings 90 and pin openings 92 to allow insertion of the studs 46 on the end plate 28 and the pins 60 on the side plate 30 to secure a side plate 30 to an end plate 28. The mid-beam locking plate 98 has two sets of spaced apart stud openings 90 and pin openings 92 to allow insertion of the studs 46 on two end plates 28 and the pins 78 on the mid-beam 38 to secure the mid-beam 38 to two end plates 28. The side locking plate 96 and mid-beam locking plate 98 can be configured to not extend along the exterior sides 42 of the end plates 28.

Figure 9:
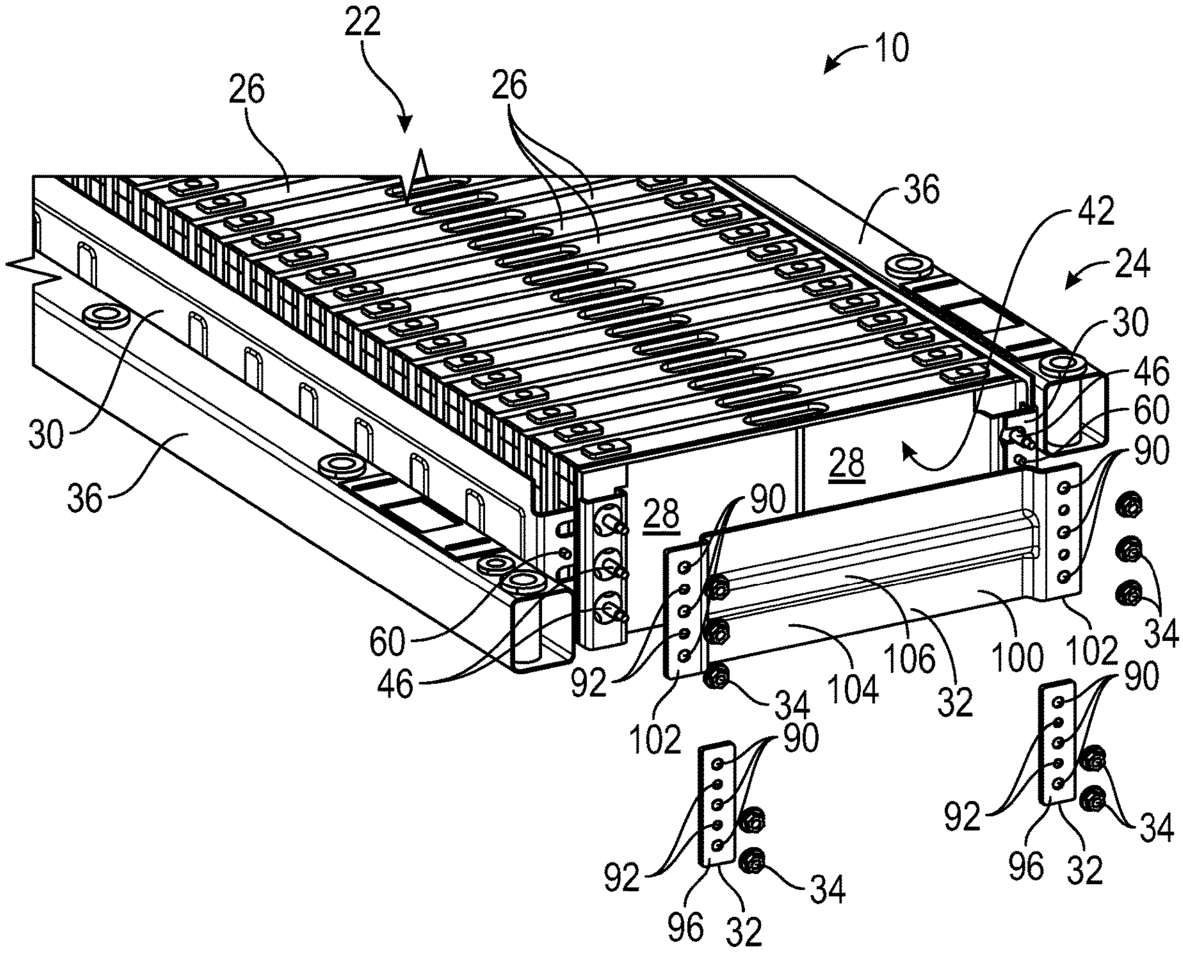
FIG. 9 is a fragmented isometric exploded view of single battery cell stack battery module with a single locking plate or multiple locking plates according to an exemplary embodiment.

Referring to FIG. 9, the battery module 10 may include a single battery cell stack 22. When the battery module 10 has a single battery cell stack 22, each of the side plates 30 can be individually secured to the end plates 28 using the side locking plates 96. Alternatively, the locking plate 32 can be configured as a dual side locking plate 100 having opposite end locking sections 102 and an intermediate section 104 between the locking sections 102. The end locking sections 102 each have stud openings 90 and pin openings 92 to allow insertion of the studs 46 on the end plate 28 and the pins 60 on the side plate 30. The intermediate section 104 extends along the exterior side 42 of the end plate 28. The intermediate section 104 can have a rib portion 106 that extends between the end locking sections 102. The rib portions 106 can increase the stability and rigidity of the dual side locking plate 100.

Referring to FIGS. 2, 3, 8 and 9, the framing assembly 24 provides Bolted Anti-Slip Slip-Enabled Joints (BASSEJ) to mechanically join the side plate 30 and end plate 28 and mechanically join the mid-beam 38 and end plates 28 of the battery module 10 with a lockable slip plane to enable assembly and structural needs. The battery module 10 may have one or more battery cell stacks 22. Each battery cell stack 22 can be formed by placing a plurality of battery cells 26 between two end plates 28 and compressing the battery cells 26 via the end plates 28.

If a single battery cell stack 22 is being formed, side plates 30 are positioned on opposite sides of the battery cells 26 with the battery side 52 facing the battery cells 26 and the side plates 30 are moved toward the battery cells 26 and end plates 28. The locking sections 56 move relative to or slide over the exterior sides 42 of the end plates 28 and the studs 46 enter the open-ended slots 58. The locking plates 32 are then positioned with the studs 46 in the stud openings 90 and the pins 60 in the pin openings 92. The fasteners 34 are then attached to the studs 46 and secure the side plates 30 to the end plates 28. The engagement of the side plates 30 with the end plates 28 maintains the compression of the battery cells 26.

If two battery cell stacks 22 are being formed, the battery cell stacks 22 are positioned adjacent one another with each battery cell stack 22 having a facing side that faces the other battery cell stack 22 (the facing sides), and a non-facing side that faces away from the other battery cell stack 22 (the non-facing sides). A mid-beam 38 is positioned between the adjacent battery cell stacks 22 with the first side 66 facing the non-facing side of one of the battery cell stacks 22 and the second side 68 facing the non-facing side of the other battery cell stack 22. Side plates 30 are positioned on the non-facing sides of the battery cell stacks 22 with the battery sides 52 facing the battery cells 26. The side plates 30 are moved toward the battery cells 26 and end plates 28. The locking sections 56 move relative to or slide over the exterior sides 42 of the end plates 28 and the studs 46 enter the open-ended slots 58. The battery cell stacks 22 are moved toward the mid-beam 38. The first and second locking portions 72, 74 move relative to or slide over the exterior sides 42 of the end plates 28 and the studs 46 enter the open-ended slots 76. The locking plates 32 are then positioned with the studs 46 in the stud openings 90 and the pins 60 and pins 78 in the pin openings 92. The fasteners 34 are then attached to the studs 46 and secure the side plates 30 and mid-beam 38 to the end plates 28. The engagement of the side plates 30 and mid-beam 38 with the end plates 28 maintains the compression of the battery cells 26 in both battery cell stacks 22.

The use of the open-ended slots and pins and Bolted Anti-Slip Slip-Enabled Joints (BASSEJ) to mechanically join the side plate 30 and end plate 28 and mechanically join the mid-beam 38 and end plate 28 of the battery module 10 with a lockable slip plane offers several advantages. These include enabling an improved and easier assembly technique that meets structural needs and the battery module 10 may be easily non-destructively disassembled to allow for module level serviceability and easy recycling.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A battery module comprising:

a plurality of battery cells positioned in a battery cell stack, the battery cell stack having stack ends positioned opposite to each other and stack sides that extend between the stack ends, wherein the stack sides are positioned opposite one another, and each stack end is defined by a single one of the plurality of battery cells and each stack side is defined by all of the plurality of battery cells positioned in the battery cell stack;

an end plate having an end plate battery side facing one of the stack ends and an end plate exterior side opposite the end plate battery side, the end plate exterior side having at least a pair of studs extending away from the exterior side;

a pair of side plates each having side plate ends opposite one another and a sidewall section that extends between the side plate ends, the sidewall section having a sidewall battery side facing the stack sides of the battery cell stack and a sidewall exterior side opposite the sidewall battery side, each side plate end having a locking section that extends perpendicular and away from the sidewall section in a direction towards the stack sides of the battery cell stack, the locking section having an open ended slot and having a pin that extends parallel to the sidewall section and away from the locking section and the stack ends;

a locking plates securing the side plates to the end plate, the locking plates having a plurality of stud openings and a plurality of pin openings; and a plurality of fasteners, wherein the end plate is positioned on one of the stack ends of the battery cell stack, and one of the side plates is positioned along each stack side of the battery cell stack such that each locking section of the pair of side plates is disposed over the exterior side of the end plate and the studs are disposed in the open ended slots, wherein the locking plate is disposed over the locking sections, the studs are disposed in the plurality of stud openings and the pins are disposed in the plurality of pin openings to provide a lockable slip plane for assembly, and wherein the fasteners are attached to the studs to couple the end plate, the pair of side plates, and the locking plate together to maintain compression of the battery cell stack.

2. The battery module of claim 1, wherein the end plates includes side edges and each one of the at least pair of studs is located adjacent to a respective one of the side edges.

3. The battery module of claim 1, wherein the locking plate has end sections and an intermediate section that extends between the end sections, each end section having at least one of the stud openings and at least one of the pin openings.

4. The battery module of claim 3, wherein the locking plate intermediate section has a rib portion that extends between the end sections.

5. The battery module of claim 1, further including a pair of side beams having opposite ends, a rectangular cross section, and a sidewall surface, wherein each one of the pair of side beams is attached to the sidewall exterior side of a respective one of the pair of side plates.

* * * * *